April 5, 1966   B. R. HALPERN   3,243,843
APPARATUS FOR PREPARATION OF IMAGES
Original Filed April 10, 1961

INVENTOR
BERNARD ROBERT HALPERN

BY *Lynn Barratt Morris*

ATTORNEY

United States Patent Office 3,243,843
Patented Apr. 5, 1966

3,243,843
APPARATUS FOR PREPARATION OF IMAGES
Bernard Robert Halpern, Swarthmore, Pa., assignor to E. I. du Pont de Nemours and Company, Wilmington, Del., a corporation of Delaware
Original application Apr. 10, 1961, Ser. No. 101,981. Divided and this application Mar. 8, 1963, Ser. No. 263,800
6 Claims. (Cl. 18—1)

This invention is a division of my application, Serial No. 101,981, filed Apr. 10, 1961, and relates to apparatus for the preparation of negative images, and more particularly for the preparation of such images from opaque pressure-clearable films.

Many techniques have been developed for the preparation of negative images from printing plates and engravings. These techniques, however, are time consuming and costly. The most commonly used conversion methods include:

(1) *Opaque "repro" proof.*—An ink impression of the relief printing form is made on paper and the printed image is photographed in a process camera to yield a negative image corresponding to the relief surface. For uses requiring a right-reading negative, two additional contact photographic steps are required or the image reversal must be accomplished optically in a camera. The process suffers from loss of fidelity due to ink squeeze-out in making the impression which results in the tendency of characters to be slightly bolder than the original.

(2) *Transparent "repro" proof.*—This technique is similar to the opaque "repro" proof method except that the image is printed on a thin, transparent sheet, e.g., cellophane. The print is a transparent positive of the relief surface. Only contact photography is involved to obtain a negative but ink squeeze-out remains a problem.

(3) *Ink impression on a photographic film.*—An ink impression is made on the emulsion side of a high contrast photographic film, the image acting as a light stencil or a development resist. All the problems of pulling a precise proof exist.

(4) *"Britetype" photography (Ludlow Typograph Co., 2032 Clybourn Avenue, Chicago 14, Illinois).*—A relief plate is completely blackened by coating with carbon black. The printing surface is then cleaned to expose the metal relief image, and the treated plate is photographed with a camera fitted with a broad light source designed to eliminate specular reflection. The resulting positive is used to make a contact negative. Fidelity by this process is excellent, if care is taken in preparing the forms. The process has been described in the periodical, Book Production, July 1958, and in U.S. Patents 2,609,293, 2,704,410 and 2,751,294.

Bechtold U.S. Patent 2,957,791, Oct. 25, 1960, describes a technique of preparing negatives from relief printing forms by clarifying, imagewise, a coalescible opaque film having microscopic voids extending therethrough and communicating with the surface.

Inasmuch as most relief printing forms are non-planar and have slight variations in printing height, manual makeready to adjust for these variations is necessary, so that a uniform pressure can be applied in transferring ink from the printing surface to a sheet of paper or other material. When repro proofs, or transparent impressions, or ink impressions on photographic film, as explained above, are required for photographic conversions from a relief to a photomechanical printing means, even more exacting makeready is necessary. Opaque pressure-clearable film, when used for such conversions, requires pressures considerably higher than those used when printing with ink, i.e., of the order of 10,000 lb./sq. in., in order to produce satisfactory clarification of the printing detail. When this is done on a proof press or on a hydraulic press, the required pressures frequently reach a destructive magnitude with metal type and electrotypes, unless heat is also applied to permit reduction of the pressure. Uniform and controlled heating, however, is difficult and expensive and requires equipment not usually available in a printing plant. Even so, makeready must be extremely exacting, and the tympan sheet on the press is usually indented and must be replaced every time a different form is used for conversion with pressure coalescible film. This is an undesirable limitation.

An object of this invention is to provide an apparatus for preparing negative images which is simple. Another object is to provide an apparatus which gives images of high quality and dimensional accuracy. Still another object is to provide an apparatus which is economical, simple to use and forms good clear images in opaque, pressure-sensitive films in relatively short times. Yet another object is to provide apparatus that can be used in normal room light. A still further object is to provide an apparatus which gives high quality conversion negatives without requiring exacting makeready. Still further objects will be apparent from the following description of the invention.

The process of my prior application for forming clear or optically transparent images in opaque pressure-clearable films comprises maintaining in contact with a relief surface, e.g., of a printing form, a thin, flexible sheet embodying a stratum of opaque pressure-clearable material while subjecting the surface of said sheet to an exceedingly large number of individual impact pressure forces of small area and magnitude applied over the entire surface area of said relief. These impact forces can be applied in a vertical direction and/or at various angles from the vertical, systematically or at random, until the entire surface of the relief has been subjected to an overlapping series of impact pressures. This results in the opaque stratum becoming clear or being clarified directly above the relief areas of the form but the remaining areas remain opaque, and a clear negative image of the relief is formed in said stratum. The impact forces may be in the form of direct applied pressure and/or there may be some sliding or rolling action whereby pressure-coalescible particles of very small particle size, for example, coalesce to form a more dense homogeneous non-opaque or clarified area of lesser thickness than the original stratum.

According to one important aspect of the prior application, the process is carried out by subjecting the opaque pressure-clearable stratum while it is in contact with the relief surface of a printing form to bombardment by a vibrating mass of small discrete pellets. The stratum itself need not be directly subjected to the bombardment, as there may be interposed between the stratum and the pellets a thin, protective sheet, or film. The mass of pellets may be in a confined chamber placed above the relief and contacting opaque pressure-clearable film or the relief and said film may be above the mass of pellets.

The novel apparatus of this invention comprises a support adapted to vibrate in at least one of the directions essentially horizontal and non-horizontal, a confining frame positioned to vibrate with said support and containing within its confines, and also adapted to vibrate in consonance with the support, a large number of discrete, rounded impact elements, means for maintaining in operative association with said support and adjacent said frame a relief printing form having maintained on the surface of the relief an opaque pressure-clearable stratum subject to impact forces from the vibrating elements, there being at least one thin, protective sheet between said stratum and said particles and arranged to transmit impact forces directly to said stratum.

According to one aspect of the invention, the support can consist, for example, of a vibrating table having mounted on its upper surface a relief printing form, e.g., type matter, a line or halftone or engraved printing plate or a combination of such printing reliefs, bearing a stratum of opaque, pressure-clearable material, a support for said stratum, a thin protective sheet and a shallow confining frame containing the discrete impact members, the frame and relief being attached to the table and adapted to vibrate with it.

In an alternative apparatus, a vibrating table carries the shallow confining frame containing the impact members, and the printing relief and opaque pressure-clearable stratum covering the relief are carried by a separate support, said stratum, however, being adjacent to and subject to impact forces from said particles.

The invention will be further described with reference to the accompanying drawings wherein.

Figure 1:
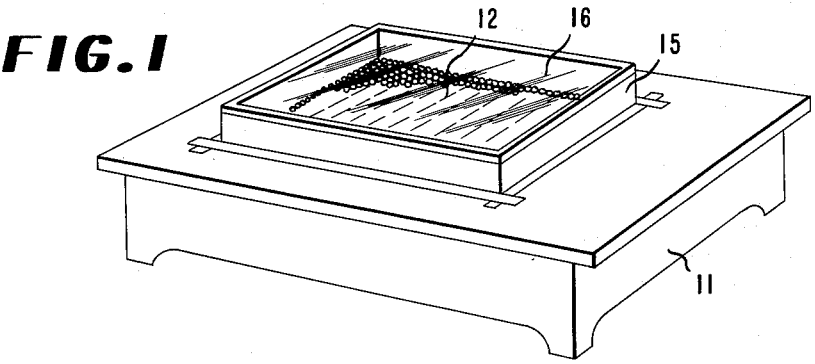
FIG. 1 is a perspective view of one type of apparatus useful in carrying out the invention.
Figure 2:
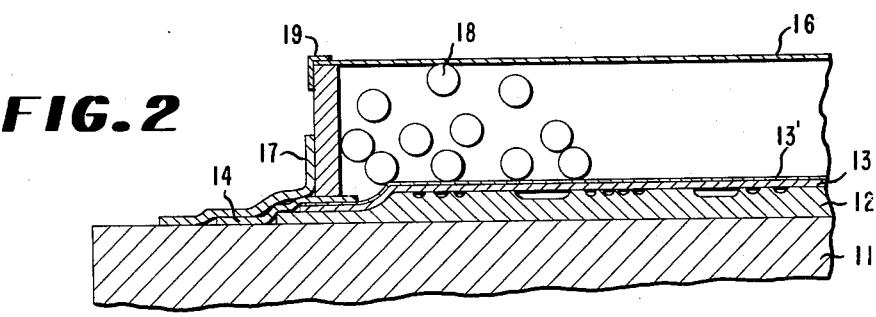
FIG. 2 is a vertical section of a portion of the apparatus of FIG. 1.
Figure 3:
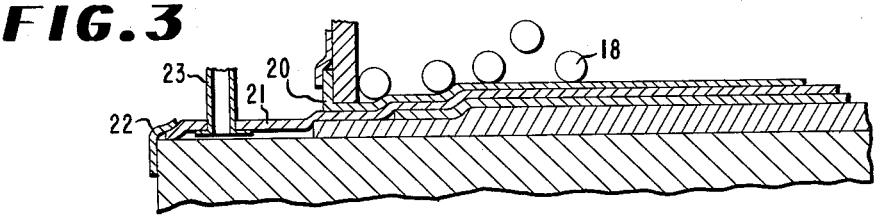
FIG. 3 is a vertical section of a portion of an apparatus like that of FIG. 1 but embodying means for reducing pressure in the area surrounding the relief.

With reference to the drawings, where the same reference numbers refer to the same parts in the several figures, a support or table 11 capable of vibrating in vertical, horizontal or combined vertical and horizontal directions of slight magnitude, has mounted thereon a relief printing form 12. A thin, flexible sheet of opaque pressure-clearable film 13 which may be an unsupported film or carried by a thin, flexible support or base 13' transparent to visible light radiations is placed over the printing form and held in position so that it conforms to the printing surface of the relief by suitable means, e.g., an adhesive strip or tape 14. A shallow confining frame 15 having side and end walls and a cover (preferably transparent) 16 for its top surface, is placed over the relief printing form and contacting sheet having the opaque pressure-clearable stratum and the walls of said frame fastened to table 11 by suitable means, e.g., an adhesive tape 17. A large number of small discrete pellets having a rounded, hard surface can be placed in the frame 15 before the cover is applied. However, in a further aspect of the invention as shown in FIG. 3, the bottom of frame 15 can also be provided with a thin bottom sheet of plastic material which can be fastened to the frame by means of adhesive tape in the same way as the cover. This bottom sheet 20 should be somewhat flexible to have uniform surface contact with the opaque pressure-clearable film spread across the printing surface of the relief form. The frame having the bottom member thus constitutes a tray which can be removed.

As shown in FIG. 3, a thin flexible sheet of plastic material can be placed over the opaque pressure-clearable film. This sheet constitutes a vacuum shroud 21, when its edges are sealed to the surface of the table by means of sealing tape 22. An air eduction tube 23 extends through the shroud and is connected to a source of reduced pressure or vacuum pump (not shown).

Figure 4:
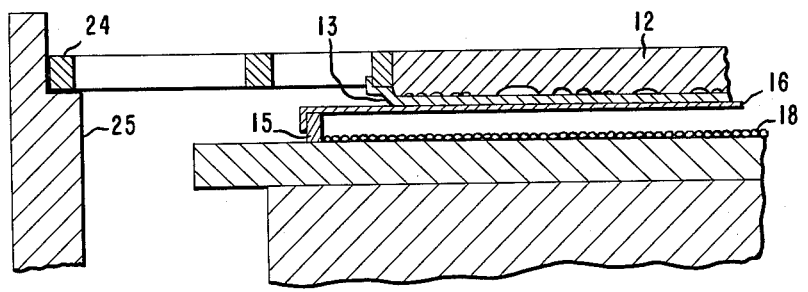
FIG. 4 is a vertical section of a modified apparatus with the printing relief being carried by a separate support.

A practical alternative apparatus of the invention is shown in FIG. 4 of the drawing. In this embodiment, the frame containing the pellets 18 and having a thin cover sheet of plastic material is placed on the vibrating support or table 11. This frame preferably also has a bottom 20 so that the frame and its contents can be removed from the support. A printing form 12 (in this case a Linotype form locked in a chase 24) is placed with the printing surface of the form facing downward. The sheet 13 of pressure clearable film extends across the surface of the Linotype form and is fastened by means of adhesive tape to structural members of the chase. The chase is supported by a suitable frame 25 that can be adjusted upwardly or downwardly. Alternatively, the support or table 11 can be adjusted upwardly and downwardly so that, in either case, the cover for the frame containing the impact elements can be brought into surface contact with the opaque pressure-clearable film element.

The vibrating frame or table can be vibrated or set in motion by any suitable mechanical or electrical unit or mechanism that will impart to it a vibratory motion with horizontal and/or upward components. A conventional electrically energized vibratory motor element (not shown) can be attached to the support 11 in any suitable way, for example, as shown in Stecker U.S. Patent 2,134,081, Oct. 25, 1938. The useful, opaque, pressure-clearable films are generally white in appearance and have been termed also pressure-clarifiable or pressure-coalescible films. The opaque areas of the films are changed or converted by means of pressure into clear areas readily transparent to visible light and of lesser thickness than the opaque areas. These films are clearable by heat and by heat and pressure.

Practical opaque porous films which can be selectively cleared by pressure useful for the process of the present invention are described in Bechtold U.S. Patents 2,846,727, 2,848,752 and 2,957,791, and in Bechtold U.S. application Ser. No. 63,953 filed Oct. 21, 1960, which is a continuation-in-part of 2,957,791.

The preferred films of the Bechtold patents are porous, opaque, non-fibrous films of low bulk density composed of partially coalesced discrete particles of a hydrophobic organic addition polymer of at least one ethylenically unsaturated monomer selected from the group consisting of vinyl and vinylidene monomers, said polymer having a wholly carbon chain, a molecular weight of at least 10,000, the units of the polymer having an average molecular weight of below 150 and preferably about 45 to about 150; said films having an open-cell structure characterized by microscopic voids uniformly disposed throughout and communicating with the surface, the open-cell voids, as measured by a conventional mercury intrusion method, being of substantially uniform size averaging less than a micron and preferably less than ½ micron in their average diameter and constituting 20% to 80% by volume of the films, said films (a) having a degree of opacity such that a thickness of 3 mils and greater has a light transmission of less than 10% at 4000 A., and upon being subjected to pressure imagewise, e.g., 10,000 pounds per square inch at room temperature has at least a 3-fold increase in light transmission, and (b) sustaining a permanent reduction in thickness of about 20% to about 80% when subjected to such pressure and temperatures. The low bulk density films are highly permeable, their permeability to water vapor being at least 10 times greater than the corresponding films of the same polymer and thickness which are non-porous or which have closed-cell voids. The films or coatings, because of the microscopic void structure communicating with the surface, are highly opaque. The bulk densities of the films, in general, are from about 0.25 to 1.0 gram per cc. The opacity of these films is such that not more than 10%, generally 5% or less, of light is transmitted (measured at 4000 A. on G.E. Spectrophotometer Cat. 5962004G65) using films of about 3 mils thickness. A further characteristic is that the clarified film (obtained by a pressure of about 10,000 lbs./sq. in. at room temperature, i.e., 25° C.) transmits at least three times as much light, generally over five and preferably ten times or more, as the opaque original film.

The opaque films or coatings most useful in the apparatus of this invention have uniform microscopic open-cell pores of average diameter of less than a micron and a major part less than ½ micron. The pores can be collapsed by the application of energy such as pressure and/or heat. Pressures of 10,000 lbs./sq. in. are generally sufficient to clarify the film. The use of a solvent will also collapse pores, e.g., a pen dipped in a solvent drawn across the opaque film produces clear portions where the solvent contacts the film.

Because of their high opacity at 4000 A., the films are especially suitable for photoprinting normally conducted by exposure to light in the vicinity of 4000 A.

The opaque portions also accept ink readily and can be further opacified, e.g., by soaking in an aqueous solution of a black dye, Colour Index No. 15710 afterchromed with a ligand/chrome ratio of 2, blotting and drying. The optical density of the unclarified background areas can thus be increased to 4.5 or higher as measured with a Welch Densichron. Other dyes, e.g., Prussian Blue, and chromates as well as "in situ" deposition of optically dense materials such as lead sulfide as specifically illustrated herein give particularly useful dense backgrounds which contrast with the substantially transparent clarified areas of the film.

Preferably the difference in optical density between selectively clarified areas and the background should be at least 1.0. This permits the exposure of many photosensitive compositions to be carried out successfully without substantial reaction in those areas masked by the opaque areas. Post-densification as described above can be employed if the above difference in density is not directly attained. The deposition of optically dense material in the non-clarified open-cell porous portion is desirable since the resultant image-bearing film is considerably more durable, i.e., resistant to possible scratches, pressure, solvents, etc., to which it may be subjected in use or handling.

In a preferred method of operation a carefully cleaned relief printing form is mounted on the bed of an oscillating device, overlaid with a sheet of opaque pressure-clearable film and preferably covered with a thin protective sheet of transparent plastic material. The pressure-clearable film and the cover sheet are fastened and sealed to the bed of the vibrator by means of adhesive tape. Preferably, a vacuum is then applied between the vibrator table and the cover sheet by means of an eduction tube. This insures good contact between the pressure coalescible film and the printing form and prevents any lateral shifting of these two components. A frame of suitable size is then placed on the assembly and enough pellets, e.g., steel balls, lead shot or beads, placed inside the frame to form a single, loosely packed layer. The frame is fastened to the vibrator bed and covered with a sheet of plastic to confine the vibrating pellets. The vibrator is then set into motion which causes the pellets to bounce and strike each other and the underlying assembly in a truly random fashion, thus clarifying the pressure-clearable film by impact. The progress of the clarification can be observed without disturbing the relative positions of the printing form and the clearable film by turning off the vibrator and removing the pellets. Usually, adequate imagewise clarification is obtained in about 2 to 15 minutes.

The height of the frame used in the above application should be at least equal to 3 diameters of the pellets, preferably 5 to 10 diameters in order to allow enough free motion during vibrating. Also, the frame is advantageously equipped with a bottom of thin plastic film to form a tray. This arrangement allows for rapid and convenient mounting and removal of the impact unit.

The number of pellets used can also vary. Usually, the number is large enough to form approximately a single layer over the whole area enclosed by the frame or tray described above. However, a smaller or larger number of pellets can be used, i.e., a number to form ½ to 1½ layers over the tray area. Outside these limits the time required to clarify the coalescible film may have to be increased. This is so because with a very small number of pellets the number of impacts per unit of time is reduced, whereas with a very large number, the mean free path of the pellets is reduced by mutual hindrance which again results in fewer effective impacts.

The pellets can be of spherical, spheroid, egg-shaped or regular or irregular polyhedral shape but without sharp edges or points. They can be of uniform or non-uniform size and shape. The size of the pellets can vary from $\frac{1}{16}$ of an inch diameter or less to as much as one inch or more. The most suitable size depends on a number of factors such as the material of which they are made and, therefore, their mass, the vibrator frequency and amplitude, the number of pellets used, etc.

The pellets can be made of any material hard enough to clarify the pressure-clearable film by impact. These materials include metals and alloys like steel, iron, lead, copper, brass, zinc, etc.; minerals; natural and synthetic resins; plastics; etc. Preferably these materials are not brittle so that they break or chip during use.

The process of the invention can be carried out in another practical manner; for example, a relief printing plate, covered with a sheet of opaque, pressure clearable film and protected with a sheet of thin plastic material, is placed in an inclined position. A large number of small pellets is introduced at the upper edge of the plate and allowed to flow over the inclined plate in a continuous stream. The plate can be reversed in position 180° or 90° and again subjected to a stream of downwardly flowing pellets. After a few minutes the opaque film becomes clarified imagewise.

Yet another procedure for carrying out the process of the invention is to provide multiple impacts in a systematic, planned pattern. Various mechanical devices are capable of delivering a very large number of small individual impact forces that can cover the whole area of a printing plate most efficiently. A practical simple machine which can be used is disclosed in assignee's U.S. patent application of Francis P. Alles, Ser. No. 101,980 filed Apr. 10, 1961, and entitled "Machine for Obtaining an Image."

The invention will be further illustrated by but is not intended to be limited to the following examples. In these examples, the opaque pressure coalescible (clearable) film that was used consisted of a sheet of polyethylene terephthalate about 2 mils in thickness except where stated otherwise, and bearing on its surface an opaque pressure-clearable layer about 0.5 mil in thickness composed of a vinyl chloride/ethyl acrylate copolymer, having the structure and characteristics defined by the claims of U.S.P. 2,957,791.

*Example 1*

An electrotype (halftone) was attached to the bed of a vibrator (a "Syntron" magnetic paper jogger type PJ 4, style 1783), providing vertical adjustable vibrations. The opaque, pressure-clearable film was placed over the electrotype, coated side down, and fastened with adhesive tape. A polyethylene terephthalate film 4 mils thick and of greater area than the electrotype was placed over the plate and the edges sealed to the vibrator table with tape. A vacuum of about 200–250 mm. Hg was then applied through an eduction tube in the cover sheet providing surface contact between the electrotype and the clearable film. A tray having a wooden frame 3 inches high with a bottom of polyethylene terephthalate film about 4 mils thick, the inside dimensions of the frame being about one inch larger in each direction than the plate area to be reproduced, was then placed on the vacuum-held assembly and secured to the table. Spheres of phenolic plastic of ¾ inch diameter were then placed within the frame. The number of spheres was such that they formed approximately a loosely packed single layer over the entire frame area. The frame was then covered with a sheet of polyethylene terephthalate film (4-mil) fastened to the top of the frame in order to confine the plastic spheres to the frame while vibrating. The vibrator was then set in motion and the vertical amplitude adjusted to cause the spheres to bounce vigorously. After nine minutes, the vibrator was turned off and the pressure-clearable film removed. It had sharp, clear areas where it had contacted the metal surface of the printing form whereas all other areas were unchanged and opaque, thus giving a right-reading negative image of the electrotype. A photographic contact print of this negative on high contrast photomechanical photographic film was prepared and the resulting wrong-reading positive image again printed by contact on another sheet of the high contrast film. This final, right-reading negative was used to expose a layer of a cellulose acetate-hydrogen succinate photosensitive printing plate composition containing triethylene glycol diacrylate as the monomer and anthraquinone as photoinitiator on a metal support, as described in U.S. 2,927,022 and U.S. 2,951,758. The exposure was made with a strong carbon arc light for about 5 minutes. The exposed element was spray-washed for 10 minutes with a 0.04 N solution of sodium hydroxide to dissolve and wash out the unexposed, unpolymerized areas of the element. The resulting relief image was an exact duplicate of the original electrotype. It furnished high quality ink prints and showed a long press life. The print quality was comparable to that of the original electrotype and no loss of fidelity and detail was observed.

*Example II*

The magnetic vibrator used in Example I was modified so that its bed or table vibrated in a horizontal rather than a vertical direction. An electrotype, a sheet of pressure-clearable film and a cover sheet were assembled on the vibrating table as described in Example I. A moderate vacuum was applied to prevent lateral shifting and a tray similar to the one described in Example I was placed on the assembly and fastened to the table. A layer of steel balls, ⅜ inch in diameter, was added to the frame and horizontal vibration induced for 12 minutes. The balls collided with each other and bounced vigorously within the frame thus striking the underlying film in a truly random fashion. Therefore, in addition to the horizontal, rolling motion induced by the vibrator, a secondary, vertical motion was introduced. The resulting negative image was of the same appearance and quality as the one of Example I. It was converted to a high contrast, wrong-reading negative by contact printing on a direct positive photographic film. A lithographic printing plate made from the final negative was of excellent quality and was used to print on an offset printing press.

*Example III*

Example I was repeated except that the magnetic vibrator was replaced by an oscillating device actuated by a rotary eccentric drive (Brackett Stripping Machine Co., Model JD) giving a combined vertical and horizontal vibration. The procedure was the same as in Example I, except that the assembly was vibrated for 5 minutes. The resulting selectively clarified coalescible film was then converted to a photographic negative as explained in Example I. A photopolymer printing plate prepared from this negative was of very good quality and showed no loss of detail when compared to the original electrotype.

*Example IV*

A frame ¼ inch high and of inside dimensions slightly larger than the printing form to be converted was attached to the bed of the magnetic vibrator described in Example I. A quantity of lead pellets (No. 6 lead shot) was poured into the frame to provide approximately a single layer of pellets. A sheet of polyvinylidene chloride film approximately 0.0006 inch thick was stretched across the top of the frame to confine the pellets.

A Linotype slug assembly was locked up in a chase and a sheet of pressure-clearable film stretched over the type form and fastened to bearers surrounding the type form. The so prepared type assembly in the chase was then placed in an inverted position on a supporting framework not connected to the vibrator in such a fashion that the pressure coalescible film covering the type just cleared the plastic cover sheet of the frame mounted on the vibrator as shown in the accompanying FIG. 4. The vibrator was then energized for 5 minutes. After that time, the type form was removed from the framework and the selectively clarified film removed from the type form. A contact positive and negative were prepared as in Example I and a photopolymer printing plate prepared from the final negative. Even though the Linotype form was composed of slugs with various degrees of wear, therefore of various heights, the resulting photopolymer printing plate gave good quality prints. No detail was lost, actually damaged characters of the Linotype were faithfully reproduced.

*Example V*

Example I was repeated except that a copper halftone plate was used in place of the electrotype. Instead of preparing a photographic negative the selectively clarified film was densified to increase its contrast. This was achieved by immersing the selectively clarified film in a 2.5% solution of a dye, Color Index No. 15710, at 50° C. for about 5 min., and afterchromed with a ligand/chrome ratio of 2. After blotting off the surface liquid and drying, the densified negative was used to prepare a photopolymer printing plate as described in Example I. The resulting plate as well as the prints prepared therefrom were of excellent quality.

*Example VI*

An electrotype printing plate was attached to an inclined plane, a sheet of pressure-clearable film was lightly stretched over the plate and a protective cover sheet of polyvinylidenechloride film of 0.6 mil in thickness was placed over the film. A large number of lead pellets (No. 6 lead shot) was then slowly poured over the inclined form from a height of about 6 to 8 inches in a continuous "rain" for about 4 minutes. The resulting selectively clarified film was then removed and converted to a photographic positive and negative as in Example I. A photopolymer printing plate prepared from this final negative was of excellent quality.

*Example VII*

A worn and badly battered Linotype form was covered with a sheet of pressure-clearable film stretched taut and attached to bearers surrounding the type form. A cylindrical brush with heavy nylon fibers was attached to a rotatable shaft by means of a chuck and arranged in such a way that the bristles touched the film covered printing form. The brush was then rotated at 1750 r.p.m. by means of an electric motor and moved across the plate assembly so that the tips of the bristles struck the back of the pressure coalescible film. This was continued for several minutes until clarification corresponding to the printing surface was obtained. The selectively clarified film was then post-densified in the unchanged background areas by in situ deposition of lead sulfide at 50° C. This was accomplished by immersing the coating successively in lead nitrate and sodium sulfide solutions with intermediate blotting, final washing in water and drying.

The selectively clarified, post-densified coating was then held against a layer of photopolymerizable material as described in Example I. After a 5-minute exposure to strong carbon arc light and removal of the unexposed areas by spray-washing with 0.04 N sodium hydroxide for about 10 minutes a high quality printing plate was obtained. Used in a conventional printing press this plate gave high quality prints. No loss of detail was observed as compared to the original type form.

*Example VIII*

Example VII was repeated, but instead of densifying the background of the selectively clarified film a photographic copy on a high contrast, direct positive film was made. For this purpose, the selectively clarified film was placed in contact with a sheet of direct positive film in a vacuum frame, the emulsion side of the direct positive film in contact with the support of the clearable film. After exposure with a point light source at about 5 ft. distance and suitable processing, a right-reading, photographic silver negative corresponding to the right-reading, selectively clarified negative was obtained. A photopolymer printing plate made from this final negative according to Example I furnished prints of good quality and with essentially no loss of detail.

*Example IX*

Example I was repeated. The selectively clarified film was printed onto a high contrast photomechanical film. The resulting wrong-reading positive was used to prepare a deep-etch lithographic plate of high quality by conventional methods.

*Example X*

A Linotype slug assembly locked up in a chase and attached to a table was covered with a sheet of pressure coalescible film attached to the bearers surrounding the form. A 4 mils thick sheet of clear polyethylene terephthalate film was laid over the assembly and sealed to the table. A moderate vacuum was applied between the table and the polyethylene terephthalate film to prevent lateral shifting of the pressure coalescible film and the printing form and insure good surface contact between these two elements. The clarifiable film was then selectively clarified by a multitude of impacts applied in a planned, systematic fashion by means of an impacting device according to assignee's copending U.S. patent application of Francis P. Alles, Ser. No. 101,980 filed Apr. 10, 1961, and entitled "Machine for Obtaining an Image." Within two minutes, clarification was complete. The right-reading negative was then reduced in size by projection printing on a sheet of high contrast film. Proper orientation of the negative yielded a right-reading positive. This was contact printed on another sheet of high contrast film. The resulting wrong-reading photographic negative was used to expose a commercial lithographic plate. After suitable processing this plate furnished prints of reduced size and excellent quality on a standard offset printing press.

*Example XI*

A sheet of opaque, pressure-clearable film was stretched over an electrotype printing plate and covered with a sheet of 4 mils thick polyethylene terephthalate film. A flat brush with steel bristles about 1 inch long was mounted on a plate capable of rapid circular motion in a plane parallel to the plate, i.e, the shoe of a commercial orbital sander. This device was energized and slowly moved over the entire film-covered plate area while a slight pressure was applied by hand. After about 5 minutes the pressure-clearable film was removed. It was clarified where it had been in contact with the raised parts of the electrotype plate. A photographic silver negative was prepared as described in Example I. This was used to expose a photopolymerizable layer containing 50 parts by weight of N-methacrylyloxymethyl polyhexamethylene adipamide, prepared as described in Example III of assignee's U.S. Patent 2,972,540 issued Feb. 21, 1961, 50 parts by weight of glycerol dimethacrylate and 0.75 part by weight of benzoin methyl ether and bonded to an aluminum support as described in Example I of assignee's Burg U.S. Patent 3,036,913 issued May 29, 1962. After exposure of the photopolymerizable layer, the unpolymerized areas were removed by brushing for 5 minutes in 95% ethanol. The resulting relief plate was used on a flat bed printing press and gave prints of excellent quality.

*Example XII*

A set of 4-color copper engravings was converted into right-reading negatives by the method explained in Example VII, except that the cylindrical brush had been carefully heated in a flame until the very tips of the nylon bristles just melted and formed little beads. The brush was cooled to room temperature before use.

Following the procedure of Example VII, right-reading negatives of the four plates were obtained in about 5 minutes. They were converted into right-reading silver negatives by a double printing step onto high contrast photomechanical film. The final negatives were used to prepare photopolymer printing plates as described in Example I. Finally, a 4-color print was prepared by printing the plates successively onto the same paper with colored inks as required in such processes. Although the original copper engravings were badly worn and required elaborate makeready before an acceptable print could be obtained, the duplicate photopolymer plates were of good quality and produced satisfactory paper prints with minimum makeready. The color print showed good registration and no loss of detail. It was virtually undistinguishable from the print made with the original copper engravings. The complete conversion, including the preparation of a 4-color proof, was completed in less than two hours.

*Example XIII*

Example V was repeated, except that a Linotype printing form was used in place of the halftone plate. The selectively clarified and densified clearable film on a polyethylene terephthalate film support 1-mil thick was used to prepare a conventional lithographic plate by placing the light-sensitive coating of the lithographic plate in intimate contact with the support of the selectively clarified film in a vacuum frame and exposing to the light of a carbon arc lamp. After conventional development, the plate was used in an offset printing press to print paper. The ink prints, when compared with the original Linotype form, were found to be of acceptable quality.

*Example XIV*

Example V was repeated, except that a Linotype slug assembly locked up in a chase was used in place of the halftone plate. An opaque, pressure-clearable film coated on a polyethylene terephthalate support ½-mil. thick was placed over the printing form, the support being in direct contact with the Linotype form. The clarified and densified film having a wrong reading negative image was then placed in intimate contact with a conventional lithographic plate. After exposure to the light of a carbon arc lamp and suitable processing, the plate was used to produce prints on a conventional offset printing press. Paper was printed and the prints were of acceptable quality.

In order to produce a faithful reproduction of a printing plate, the resolving power of the clearable film must be high enough to produce the finest details of the plate, e.g., halftone highlight dots of about 10 microns diameter. The preferred clearable materials have open pores of about 0.5 micron diameter, i.e. about 20 times smaller than the smallest detail to be reproduced. The resolving power of these materials is therefore well above the minimum requirement to obtain a good reproduction of detail.

The preferred porous, opaque, non-fibrous films can be prepared by the processes of assignee's U.S. Patents 2,846,727 and 2,848,752. One of these processes involves (1) the preparation of an aqueous dispersion of the polymer containing, based on the weight of the dispersion, from 10% to 50% of a water-soluble organic solvent for the polymer, the solvent being one which boils above 100° C. and being present in a concentration that is insufficient to dissolve the polymer, (2) shaping the dispersion in the form of a film or coating, (3) removing a substantial amount of the water and organic non-solvents by evaporation from the film until partial coalescence of the polymer occurs, as indicated by substantial clarification with tackiness, (4) washing the tacky structure with water or a liquid in which the polymer is insoluble but which dissolves the solvent for the polymer to produce a coherent film substantially free from dissolved polymer, followed by (5) washing the resultant film substantially free or organic solvent, after which the film is dried at a temperature below the softening point.

Another such process useful for the preparation of opaque, clearable, porous films, e.g., from polymethacrylonitrile or copolymers of acrylonitrile with 23–30% (on a molar basis) of isobutylene, involves the use of dispersions of these polymers in aqueous metal salt media as follows:

The polymer is dispersed in an aqueous medium having dissolved therein an inorganic salt in an amount of about 4% to about 55% based on the final composition. The salts that are effective in this process are those which in more concentrated solutions dissolve the polymer. Only nonsolvent concentrations of the salt are used in making the dispersion. The dispersion is then shaped into a film and water is evaporated from the shaped structure until coalescence occurs. The salt is washed from the resultant shaped article. The shaped article can be readily plasticized by immersing the article while in the gel state in relatively non-volatile liquids or media containing such liquids which are softeners or plasticizers for the polymers. The dispersions contain less than 35% and generally at least 2% by weight of polymer, an amount of salt at least one-half the weight of the polymer but insufficient to form salt solutions which dissolve the polymer, the salt being one whose aqueous solution at a substantially higher concentration of salt and adequate temperature is a solvent for the polymer.

Opaque films have also been obtained by an alternate process. This comprises the formation of a clustered dispersion, for example, from a polyvinyl chloride dispersion in aqueous cyclohexanol, casting and partial evaporation to a non-flowable, crack-free condition. In this situation, only a slight clarification occurs during evaporation and tackiness does not develop even on heating to remove the nonsolvent dispersion medium. A liquid polymer solvent, such as dioxane, is next applied by immersing or flooding the coating with it. Removal of solvent by washing is conducted immediately without additional evaporation. After washing and drying, a film is obtained with unusually high strength, opacity and porosity and which has a matte top surface which is less glossy than obtained by the usual process. The film has high ink receptivity. The separation and recovery of organic dispersion media from polymer solvent media is simplified by this process, which is also applicable to polystyrene.

Although the opaque polymer films obtained as in U.S. Patents 2,846,727 and 2,848,752 are particularly useful and preferred, other films or coatings of organic polymers that exhibit the necessary properties of porosity, opacity, and clarification can be used. The methods of producing other useful films include treatments of a substantially transparent film of a vinyl-type polymer or condensation polymer by solvents, followed by nonsolvents to give opaque films, layers or coatings that have the necessary properties.

Other films, although less preferred, that are opaque, porous, and become substantially transparent under pressure can be used in this process. Included are cellulose acetate films as obtained by mixing finely ground cellulose acetate in a 50/50 mixture of tetramethylurea/tert. butyl alcohol to form a dispersion, casting a film on glass, drying and washing the film. A cellulose film obtained by boiling 450 gauge cellophane for ¼ hour in ethanol, ¼ hour in benzene, and ¼ hour in pentane has the necessary porosity and pressure clarifiable properties to be useful in the process of this invention. A further opaque film that has been obtained is of polycaproamide, resulting from casting a solution of the polymer in calcium chloride and methanol (in a ratio of 4 parts of polymer to 6.6/13.3 of $CaCl_2 \cdot 2H_2O/CH_3OH$) and drying at 60° C., followed by washing in water.

In the described process, the opaque film can be a homogeneous strong unsupported film, or the opaque film portion can be a layer on a transparent, flexible, dimensionally stable base material. In general, the films or film coatings that are initially opaque and porous have a thickness at least 0.05 mil and usually up to 10 mils, preferably 0.5–2.0 mils.

Although the preferred opaque, pressure-clearable films have an open-pore structure, other opaque, clearable films can be used, e.g., films of gas expanded plastics, etc., having voids of sufficiently small dimensions to insure an adequately high resolving power for all the details to be reproduced.

The selective clarification of the opaque films according to this invention is accomplished by the action of a large number of small individual stressing forces applied in a randomized or systematic fashion. Practically every method or device capable of applying such large numbers of small stressing forces can be used to prepare negatives from printing plates according to this invention. For example, bouncing and rolling pellets, a traversing rain of pellets, rapid circular rolling motion of pellets, oscillating motion of narrow diameter cylinders, e.g., short pieces of steel wire under an oscillating sander, vibrating wires actuated mechanically or electro-magnetically, rotating flexible wires or bristles, rotating or vibrating multiple impactors, etc. Many of these devices are capable of producing selectively clarified negatives from curved printing plates.

The larger the number of individual impacts per unit of time which can be applied, the faster a uniform clarification is obtained. The devices described earlier are capable of applying from a few thousand to several million individual impacts per minute.

The image-bearing films obtained from initially opaque, organic-polymer films that have been subjected to selective clarification are positioned next to an unexposed or raw photo-sensitive plate material. Usually, the plate and image-bearing transparency are in contact during the light exposure period. However, under certain conditions, they can be separated, e.g., an inert transparent film or a screen can be placed between them if the printing plate material and image-bearing film are of such materials that any degradation of either would occur if direct contact is made, or if special screen effects are desired in the finished printing plate.

Usually, the selectively clarified film has a density differential between opaque and clear areas of about 0.5 to 1.0, measured at a wavelength of 4000 A. This is generally not sufficient to obtain a satisfactory photomechanical plate directly without interposed printing steps. The density differential can be increased by incorporating dyes or depositing dark colored chemical compounds, e.g., lead sulfide, in the pores of the film. Where these pores have been coalesced, i.e., in the clarified areas, essentially no density increase takes place. Therefore the optical contrast of the film is increased. Another method of increasing the contrast is achieved by preparing a photographic, high contrast positive from the selectively clarified film, then, if necessary, a duplicate photographic negative can be prepared by an additional contact printing step. Depending on the intended use the photomechanical printing plate may require an exposure through a right-reading negative (e.g., for relief plates), a wrong-reading negative (e.g., for lithographic plates), a right-reading positive (e.g., for intaglio plates) or a wrong-reading positive (e.g., for deep-etch offset plates, silk screens). All four possible versions can be obtained easily from selectively clarified coalescible films without need for any camera exposure by simple photographic conversions well known in the art. By using optical printing rather than contact printing, the duplicate negative or positive can also be made smaller or larger than the original plate.

Photosensitive plates useful in the processes of this invention include (1) the photopolymerizable plates such as previously described and those described in U.S. Patents 2,892,716, 2,893,868, 2,902,365, 2,923,763, 2,927,022, 2,927,023, 2,929,710, 2,948,611 and 2,951,758, (2) plastic plates topcoated with a thin photosensitive layer that is selectively exposed to light and in its subsequently developed state is used as a resist while the plastic is selectively etched with a solvent, (3) various presensitized lithographic plates, such as paper or metal based, including those bearing albuminoid coatings, (4) deep etch plates, and (5) certain bimetallic plates. The final plates can be flat or curved.

The present apparatus can be used for the photomechanical conversion of any type of relief printing form such as type, Linotype, copper engravings, electrotypes, polymer plates, etc. Intaglio plates can also be used, but they furnish a right reading positive and the continuous tone characteristics are lost.

This apparatus is also useful in preparing photographic or printed reproductions of certain bas-reliefs, etchings, medals, ornamental plaques, etc.

The apparatus of this invention offers several further advantages not achieved by conventional methods of production of printing plates from photosensitive materials starting with type forms, engravings, or similar objects having a variation in relief. In the apparatus, clarification of the opaque polymer film is rapid. Lower costs are evident since, with the apparatus, preparation of one or more photonegatives becomes unnecessary. Furthermore, images of greater detail and fidelity are obtained than in such prior art processes as those mentioned earlier. Plate handling is reduced to a minimum. The apparatus has the advantages that it is simple in construction, can be used by ordinary technicians, and is economical to build and operate.

I claim:
1. An apparatus for forming images comprising
   (a) a support adapted to vibrate in at least one of the directions essentially horizontal and non-horizontal,
   (b) a shallow confining frame attached to the support to vibrate with said support,
   (c) a large number of solid, discrete, rounded impact elements within the confines of the frame and adapted to vibrate in consonance with the support; said apparatus and frame having means adapted to position and maintain a relief surface and an opaque pressure-clearable stratum in surface contact with each other and so that the stratum is subject to impact forces from vibrating impact elements in said frame, and
   (d) at least one thin sheet extending across the frame and portions of the walls to confine said impact elements in the frame and serve as a cover for one part of the frame, one of said sheets serving to transmit small impact forces directly therethrough to said stratum; the apparatus having means for holding the relief surface adjacent the frame.

2. An apparatus according to claim 1 wherein the impact elements are present in an amount sufficient to form a single layer between the walls of the frame.

3. An apparatus according to claim 1 wherein said sheet is transparent.

4. An apparatus for forming images comprising, in combination,
   (a) a table adapted to vibrate at least in one of the directions essentially horizontal and non-horizontal and supporting a printing relief and adapted to support a stratum of an opaque, pressure-clearable material in contact with the surface of the printing relief,
   (b) a shallow confining frame having side and end walls,
   (c) a large number of small, solid, discrete, rounded impact elements disposed between said walls, and
   (d) at least one thin sheet extending across the frame and portions of the walls and confining said impact elements in the frame adjacent said table.

5. An apparatus according to claim 4 wherein the impact elements are present in an amount sufficient to form a single layer between the walls of the frame.

6. An apparatus according to claim 4 wherein said sheet is transparent.

References Cited by the Examiner

UNITED STATES PATENTS

| | | | |
|---|---|---|---|
| 1,285,816 | 11/1918 | Singers et al. | 25—41 |
| 1,752,266 | 3/1930 | Sloan. | |
| 1,817,157 | 8/1931 | Luckow | 25—122 X |
| 1,922,168 | 8/1933 | Lowell | 25—41 |
| 2,187,918 | 1/1940 | Sloan. | |
| 2,398,455 | 4/1946 | Unger. | |
| 2,629,135 | 2/1953 | Johnson | 25—122 X |
| 3,188,687 | 6/1965 | Blair | 18—1 |

WILLIAM J. STEPHENSON, *Primary Examiner.*